UNITED STATES PATENT OFFICE 2,398,396

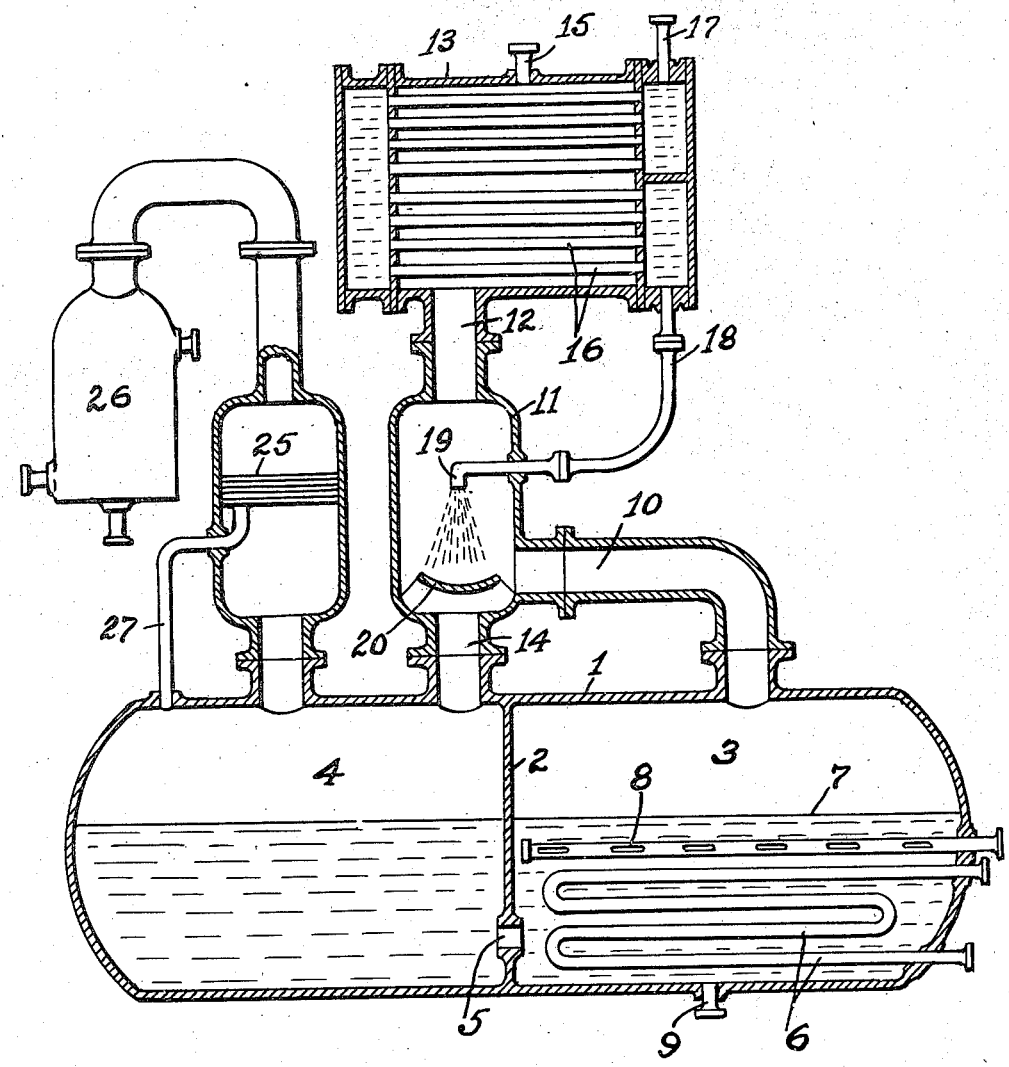

FLUID EVAPORATOR

James A. Powell, Wyomissing Hills, Pa.

Application December 31, 1942, Serial No. 470,777

12 Claims. (Cl. 202—66)

My invention relates to new and useful improvements in fluid evaporators for producing better distillates, particularly useful for the generation of pure steam from water, though not to be construed as limited to such purpose, as the essential novel principles involved in my improvements are equally applicable to the generation of pure vapor or gas from any other kind or form of liquid.

And the primary objects of my present improvements are to provide simplified and compact novel means and method for the production of vapor or gas of a relatively higher degree of dryness and with a material reduction of chemical salts or other impurities, hereinafter called solid concentration, than has heretofore been attainable, resulting in a vapor or distillate product of much greater purity. Throughout the specification the word steam is intended to include any vapor product, and the word water as generic for the fluid supplied to said evaporator.

As well known, steam evaporators are commonly used where water is required having a solid concentration lower than that of the available supply of raw or treated water, and its product is generally called condensate or distillate, and among its many uses, one is for the make-up water for steam boilers where the available supply would be objectionable or actually harmful, and another for use in process plants where pure water is needed.

Steam evaporators are universally used on board ships to provide distillate from sea water for various needs including that of boiler feed make-up. Space requirements and weight of equipment are vital features of naval design, and their boiler installations are necessarily quite different from land installations, with the boiler furnaces generally smaller in size and with smaller diameter boiler tubes, requiring, for efficient adequate operation, purer feed water make-up having much lower solid concentration than that usable in land installations. My improved fluid evaporator having greater purifying efficiency in compact space, is particularly applicable for such marine use, as it will permit high rates of evaporation with high purity of the distillate, and will reduce the space and weight of the evaporator equipment.

Having in mind my purpose for the production of distillate of a better purity or lower solid concentration than that now attainable in any heretofore known construction, my present improvements comprise an evaporator vessel in which steam is generated in a conventional and well known manner, scrubbing and diluting the solid concentration of the steam by means of water of a lower solid concentration, in-flowing with the steam to a separate vessel, supplying water to the evaporator vessel, where the solid concentration of the water is lower than the solid concentration of the water in the evaporator shell proper, and thence through a dryer or separator to a condenser, to form the condensate or distillate in known manner. The vapor might be used instead of its distillate.

The nature of my improvements and the method of operating the same will now be fully described in detail in connection with the accompanying drawing, and the novel features thereof specifically set forth in the appended claims.

The drawing shows diagrammatically, in a longitudinal sectional elevation, a preferred embodiment of a fluid evaporator made in accordance with my invention.

The type of fluid evaporator heretofore known and employed, and to which my improvements relate, comprised, in its simplest form, a shell container into which raw or treated water was admitted to a controlled level and heated, as by a coil supplied with steam from an outside source, to generate steam in the shell above the water level, and this steam then passed directly to a form of drier or steam separator, ordinarily of the mechanical type, and then to a condenser to produce the distillate. The accumulating solid concentration formed a sludge or scale in the water which from time to time was removed by blowdown or cracking in known manner.

The steam leaving such evaporator carried minute particles of moisture which had a solid concentration equal to the solid concentration of the liquid in the evaporator shell, and it will be seen therefore, that the solid concentration of the steam in this type of evaporator was a function or factor of both the amount of moisture in the steam and the solid concentration of the liquid in the evaporator shell.

As an example of what takes place in this simplest type of evaporator for land use, assume the moisture in the evaporated steam to be two percentum (.02) entering a conventional type dryer or separator, and two-tenth per centum (.002) leaving the same, and a solid concentration of three thousand (3000) parts per million (P. P. M.): The solid concentration of the steam entering the separator would be .02×3000 or 60 P. P. M., and .002×3000 or 6 P. P. M. of the steam leaving the separator. If the solid concentration in the evaporator increases say to six thousand parts per million, the steam then entering the separator would be 120 P. P. M., and on leaving the separator 12 P. P. M. It will be seen therefore, that for purity of distillate it is desirable to keep the solid concentration in the evaporator shell as low as possible; however, it is also desirable for economy to maintain the solid concentration in the evaporator shell as high as practicable to reduce the amount of heat loss in blowdown, by lengthening the periods between cracking the scale to remove the same, or reducing the amount of blowdown.

My present improvements are designed to overcome the deficiencies and limitations of the above known type of fluid evaporator and increase its efficiency and economy of operation and the production of a purer distillate.

In the accompanying drawing, indicated diagrammatically as sufficient to fully disclose my invention, 1 represents an evaporator shell, shown as divided by a partition 2 into a high solid concentration compartment 3 forming the evaporator vessel proper, and a low solid concentration compartment 4 forming the water supply vessel for the evaporator vessel 3. The compartment 4 may be a separate vessel, if desired, but must have a water passageway connection with the compartment 3, as indicated at 5.

The compartment 3 indicates an evaporator of the known type hereinbefore referred to, having heating coils 6, supplied with steam from an outside source, to heat the water extending to a level 7. Excessive solid concentration in the water may be reduced by a blowdown connection, indicated at 8, or by scale cracking and flushing through a drain, indicated at 9, as heretofore and common in this type of evaporator.

In my improved construction, a steam port, indicated at 10, carries the steam generated in compartment 3 to compartment 4, and this port 10 is shown as opening into a dilution chamber 11, having a top extension 12 diverting a portion of said steam to a suitable vent condenser 13 of any conventional construction, and a bottom extension 14 connecting said port 10 with compartment 4. The vent condenser 13 is shown with an air vent, indicated at 15, for the escape to the atmosphere of non-condensible vapors, and is also shown with tubes 16 having in one header end, a water inlet 17, and a water outlet 18 leading to a spray nozzle outlet shown as located in the dilution chamber 11, as indicated at 19. A suitable spray type heating and diluting zone having a spray plate indicated at 20, is shown as also located in chamber 11. In this dilution chamber 11 the moisture particles in the evaporated steam passing through steam port 10 having a solid concentration equal to the solid concentration of the water in chamber 3, meet the incoming water flowing through pipe 18 and nozzle 19 at spray plate 20, which incoming water has a solid concentration many times less than that of the evaporated steam, so that a scrubbing and dilution of the steam takes place, reducing the solid concentration of the steam which enters compartment 4. The water entering through inlet 17 is preheated in the tubes 16 of vent condenser 13 by steam generated in compartment 3, and falls by gravity from nozzle 19 through extension 14 into compartment 4, and supplies replacement water to compartment 3 through water connecting passageway 5. From compartment 4, the steam is admitted, as heretofore, to a dryer or separator, indicated at 25, and from there to a condenser, indicated at 26, to produce from such steam a condensate or distillate of greater purity than heretofore attainable. The moisture removed by dryer or separator 25 is drained to compartment 4 by means of drain pipe 27. The amount of water flowing from nozzle 9 it will be understood will be controlled so that it will condense only a portion of the steam in its washing and dilution action.

From the foregoing description it will be readily understood that water is supplied as needed through inlet 17 to vent condenser 13 where it is preheated in the tubes 16 of the latter by steam generated in evaporator chamber 3, and this water, after passing through spray nozzle 19, falls by gravity into low concentration compartment 4 and then flows through water passageway 5 to high concentration compartment 3 so as to maintain the supply in the latter as depleted by the steam evaporation thereof. The steam passing through steam port 10 contains minute particles of moisture, which, as previously stated, have a solid concentration equal to the high solid concentration of the water in the evaporator, but, after passing through the treatment of the much lower solid concentration of the inflowing sprayed water in the diluting chamber, such solid contents in the steam are scrubbed and diluted, with the result that an improved steam of very low solid concentration is passed to the separator and condenser.

Part of the evaporated steam generated in chamber 3, as stated, is used to pre-heat the inflowing water passing through vent condenser 13, so the flow of such steam to chamber 4 is reduced by the amount diverted for this purpose, and the capacity of the evaporator to produce distillate must be based on such reduced amount, which may be readily calculated as a definite percentage as shown in the following example.

Assuming the evaporator is run at atmospheric pressure, the water entering through inlet 17 has a temperature of sixty degrees (60°) Fahrenheit, the water in chambers 3 and 4 have a temperature of two hundred and twelve degrees (212°) Fahrenheit, and that nine hundred and seventy and three tenths (970.3) British thermal units (B. t. u.) are required to evaporate one pound of water at boiling point (212°), then:

B. t. u. in 212° F. water equals 212°—32° or__ 180
B. t. u. in inflow water equals 60°—32° or__ 28

B. t. u. required to heat water to boiling point _____ 152

B. t. u. required to raise one pound of 60° F. water to boiling point and evaporate would be 970.3 plus 152 or 1122.3.

Therefore for every 1122.3 B. t. u. of heat input to the evaporator through heating coils 6, 152 or (152/1222.3) 13.4% of the steam evaporated would be used for preheating the inflowing water, leaving 83.6% of the evaporated steam for producing the distillate. Part of the steam, as stated before, is lost by condensation in the washing and dilution chamber, but its percentage of moisture is not changed in passing through compartment 4, as the water therein is not evaporated and is therefore quiescent.

As a comparative example of the operation of my improved evaporator, above described, with the example previously recited for that of the heretofore known evaporator, assume the solid concentration in the evaporator water to be the previously high of six thousand (6000) P. P. M., and 150 P. P. M. to be the solid concentration in the inflowing raw or treated water to be evaporated. With two per centum (.02) of minute particles of moisture in the steam at the same solid concentration as that of the evaporator, namely six thousand (6000) P. P. M., (.02×6000), results in 120 P. P. M. of solid concentration in the steam coming into contact with one hundred per centum (100%) of the raw or treated water of 150 P. P. M., during my scrubbing and diluting operations, the resultant solid concentration of the mixture of steam and raw water entering the low concentration chamber 4, would be the sum of 120 and 150, or 270 P. P. M. Then assuming two per centum moisture (.02) for the steam entering the separator 25, and two-tenth per centum (.002) as the steam moisture leaving the same, as in the previous sample for the heretofore known evaporator, the purity or solid concentration in the present example would be .02×270 or 5.40 P. P. M. for the entering steam, and .002×270 or .54 P. P. M. for the steam leaving the separator.

It will thus be seen that with my improved evaporator and method of its operation, as above fully described, and under the above stated assumed conditions, I will produce distillate of a purity of .54 P. P. M. as compared with a distillate of 12 P. P. M. treated in the heretofore known type of evaporator, and that such improved results permits me to produce higher purity vapor or distillate, or to operate my evaporator at longer intervals between blowdowns or cleaning periods.

Moreover, my improved vapor purifier fluid separator, as described, is not subject to the ills of the ordinary type of evaporator, such as: Limiting heat drop between temperature in the heating coils and temperature in the evaporator, sensitive water level in the evaporator, or carry over, which occurs when the solid concentration gets out of hand; as the purity of the distillate from my improved evaporator is more of a function or factor of the solid concentration of the inflowing raw or treated water, than that of the solid concentration carried in the evaporator chamber of the shell.

While I have illustrated and described what I now consider to be a preferred embodiment of my invention as applicable particularly for the generation of pure steam for distillate product, it will readily appear to those skilled in the art that my improved construction and method of operation are equally applicable to the generation of vapor or gas for other purposes and from any other kind or form of liquid, and that various modifications, changes, substitutions, omissions and additions may be made to the apparatus illustrated and described, and to the method of operation, without departing from the spirit and scope of my invention as specifically defined in the following claims.

What I claim is:

1. The method of purifying vapor discharged from a fluid evaporator, which comprises intimately treating said vapor with inflowing supply fluid for said evaporator, the amount of such inflow being sufficient to condense only a portion of said vapor, passing said vapor and fluid into a separate vessel, feeding the evaporator with fluid from said vessel, withdrawing the vapor from said vessel, and drying said withdrawn vapor.

2. The method of purifying vapor discharged from a fluid evaporator, which comprises washing and diluting said vapor in a sprayed stream of inflowing supply fluid for said evaporator, the amount of such inflow being sufficient to condense only a portion of said vapor, jointly passing said vapor and fluid into a vapor and fluid containing zone, feeding the evaporator with fluid from said zone, withdrawing the vapor from said zone, and drying said withdrawn vapor.

3. The method of purifying vapor discharged from a fluid evaporator, which comprises utilizing a portion of said vapor to preheat the inflowing supply of fluid for said evaporator, washing and diluting the remainder of said vapor in a sprayed stream of said preheated fluid, the amount of flow of said stream being sufficient to condense only a portion of said vapor, then passing said vapor and water into a vapor and fluid containing zone, feeding the evaporator with fluid from said zone, withdrawing the vapor from said zone, and drying said withdrawn vapor.

4. A method of evaporating fluids containing solid concentration, comprising boiling said fluid in an evaporator vessel, withdrawing the evaporated vapor from said vessel, reducing the solid concentration in said vapor by washing and diluting the same with the relatively less solid concentration in the inflowing fluid supply for said evaporator vessel, said fluid supply being sufficient to condense only a portion of said vapor, passing said vapor and fluid to a vapor and fluid containing zone, feeding fluid from the latter to said evaporator vessel, withdrawing the vapor from said zone, and drying said withdrawn vapor.

5. A method of evaporating fluids containing solid concentration, comprising boiling said fluid in an evaporator vessel, withdrawing the evaporated vapor from said vessel to a washing and diluting chamber, feeding supply fluid for said evaporator vessel of relatively less solid concentration than the solid concentrate in said vapor, spraying said supply fluid into said washing and diluting chamber to wash and dilute the solid concentration of the vapor therein, said supply spray being sufficient to condense only a portion of said vapor, then passing said vapor and water into a vessel containing a quiescent storage of said inflowing supply fluid, feeding fluid from the latter to said evaporator vessel, withdrawing the vapor from said quiescent fluid storage vessel, and drying said withdrawn vapor.

6. A method of evaporating fluids containing solid concentration, comprising boiling said fluid in an evaporator vessel, utilizing a portion of the evaporated fluid to preheat the inflowing supply fluid for said evaporator vessel of relatively less solid concentration than the solid concentration of said evaporated fluid, passing the remainder of said evaporated vapor to a washing and diluting chamber, feeding the preheated supply fluid in a sprayed stream into said washing and dilution chamber to wash and dilute the solid concentration of the vapor therein, said stream being sufficient to condense only a portion of said vapor, than jointly passing said vapor and water into a vessel containing a quiescent storage of said inflowing supply fluid, feeding fluid from the latter to said evaporator vessel, withdrawing the vapor from said quiescent fluid storage vessel, and drying said withdrawn vapor.

7. Apparatus for purifying vapor discharged from a fluid evaporator, comprising a fluid evaporator vessel having means for boiling the fluid supplied thereto, a fluid storage supply vessel having a feed supply connection with said evaporator vessel, a vapor discharge port connecting said evaporator vessel with said fluid storage supply vessel, a washing and diluting chamber in said port, a supply fluid inlet pipe having a discharge outlet in said washing and diluting chamber, a vapor and fluid discharge conduit from said washing and diluting chamber opening into said fluid storage supply vessel, and a vapor discharge conduit from said fluid storage supply vessel opening into a vapor dryer.

8. In the construction set forth in claim 7, a vapor-heated fluid and vapor mixing spray baffle plate in said washing and diluting chamber of said evaporator port.

9. In the construction set forth in claim 7, a fluid preheating device for said fluid inlet pipe, and a preheating vapor diverting conduit thereto from said evaporator vapor discharge port.

10. Apparatus for purifying vapor discharged from a fluid evaporator, comprising a shell having a partition dividing the same into a fluid storage compartment and a fluid evaporator compartment, fluid-boiling means in said evaporator compartment, a fluid level maintaining supply aperture connecting said compartments, a casing outside said shell having an interior vapor and fluid mixing chamber, a vapor port connecting said evaporator compartment with said mixing chamber, a separate port connecting said mixing chamber with said storage compartment, a fluid preheater having a heating chamber and fluid-passage tubes therein, a fluid inlet for said preheater, a discharge pipe for said preheater opening into said mixing chamber, a vapor port for said mixing chamber opening into the heating chamber of said preheater, a vapor dryer outside said shell, and a vapor discharge port connecting said fluid storage compartment with said vapor dryer.

11. The method of purifying vapor discharged from a fluid evaporator which comprises intimately contacting said vapor with inflowing fluid for said evaporator in a washing and diluting zone, the amount of such inflow being sufficient to condense only a portion of said vapor, flowing the fluid from the washing and diluting zone to a containing zone, feeding the evaporator with fluid from said containing zone, withdrawing vapor from said containing zone, and drying the withdrawn vapor.

12. Apparatus for purifying vapor discharged from a fluid evaporator, comprising a fluid evaporator, washing and diluting means, means through which vapor from the evaporator is conducted to the washing and diluting means, means through which supply fluid for the evaporator is introduced into the washing and diluting means, the arrangement being such that the vapor from the evaporator and the supply fluid intimately contact each other in the washing and diluting means, a dryer, and separate container means in communication with the washing and diluting means, with the dryer and with the evaporator into which fluid from the washing and diluting means passes and flows to the fluid evaporator and into which vapor from the washing and diluting means passes and flows to the dryer.

JAMES A. POWELL.